US012736427B2

(12) United States Patent
Cadonau et al.

(10) Patent No.: US 12,736,427 B2
(45) Date of Patent: Sep. 15, 2026

(54) PRESSURE SENSOR, SYSTEM FOR MOUNTING AND DEMOUNTING OF THE PRESSURE SENSOR AND USE OF THE PRESSURE SENSOR

(71) Applicant: Kistler Holding AG, Winterthur (CH)

(72) Inventors: Thomas Cadonau, Kirchberg (CH); Stanislaw Tomaszczyk, Winterthur (CH)

(73) Assignee: Kistler Holding AG, Winterthur (CH)

( * ) Notice: Subject to any disclaimer, the term of this patent is extended or adjusted under 35 U.S.C. 154(b) by 289 days.

(21) Appl. No.: 18/529,053

(22) Filed: Dec. 5, 2023

(65) Prior Publication Data

US 2024/0192073 A1 Jun. 13, 2024

(30) Foreign Application Priority Data

Dec. 7, 2022 (EP) .................................... 22212009

(51) Int. Cl.

| | |
|---|---|
| ***G01L 19/00*** | (2006.01) |
| ***G01L 7/08*** | (2006.01) |
| ***G01L 9/00*** | (2006.01) |
| ***G01L 19/14*** | (2006.01) |
| ***G01M 15/08*** | (2006.01) |

(52) U.S. Cl.

CPC .......... *G01L 19/0046* (2013.01); *G01L 7/082* (2013.01); *G01L 9/0041* (2013.01); *G01L 9/008* (2013.01); *G01L 19/0007* (2013.01); *G01L 19/003* (2013.01); *G01L 19/0038* (2013.01); *G01L 19/144* (2013.01); *G01M 15/08* (2013.01)

(58) Field of Classification Search

CPC ... G01L 19/0046; G01L 7/082; G01L 9/0041; G01L 9/008; G01L 19/0007; G01L 19/003; G01L 19/0038; G01L 19/144; G01M 15/08

See application file for complete search history.

(56) References Cited

U.S. PATENT DOCUMENTS 4,559,821 A * 12/1985 Engeler ..................... G01L 5/14 73/167
7,373,827 B2 * 5/2008 Sonderegger ....... G01L 19/0645 73/706

(Continued)

FOREIGN PATENT DOCUMENTS

CH 696 731 A5 10/2007
CN 115 066 548 A 9/2022

(Continued)

OTHER PUBLICATIONS

DE-102016123218-A1 (Year: 2018).*
EPO Search Report with Translation, May 26, 2023, 10 pages.
JP Office Action with Translation, Feb. 12, 2025.

*Primary Examiner* — Ryan D Walsh
(74) *Attorney, Agent, or Firm* — Dority & Manning, P.A.

(57) ABSTRACT

A pressure sensor for measuring the pressure of a fluid medium includes a mounting device, a sensor device and a sealing element. The mounting device holds the sensor device and is mountable in a mounting bore of a wall. The sensor device includes a diaphragm and a sensor element, which generates a measurement signal for a pressure-dependent deformation of the diaphragm. The sealing element seals the mounting bore and includes a trunnion held by a socket of the sensor device.

15 Claims, 5 Drawing Sheets

(56) References Cited

U.S. PATENT DOCUMENTS

2015/0034039 A1* 2/2015 Takahashi ........... G01L 19/0672
123/193.5
2016/0053925 A1* 2/2016 Dohi ....................... F16L 21/03
285/337
2023/0160769 A1 5/2023 Nishizawa

FOREIGN PATENT DOCUMENTS

DE 102016123218 A1 * 6/2018 ........... G01L 19/144
EP 0 488 446 A1 6/1992
EP 1 146 326 A2 10/2001
JP H 1164048 A 3/1999
JP 2016-200594 A 12/2016

* cited by examiner

PRESSURE SENSOR, SYSTEM FOR MOUNTING AND DEMOUNTING OF THE PRESSURE SENSOR AND USE OF THE PRESSURE SENSOR

FIELD OF THE INVENTION

The invention relates to a pressure sensor for measuring the pressure of a fluid medium confined by a wall that defines a mounting bore configured for mounting the pressure sensor in a manner that disposes the pressure sensor for measuring the pressure in the fluid medium. The invention also relates to a system for mounting and demounting of the pressure sensor and to a use of the pressure sensor.

BACKGROUND OF THE INVENTION

EP1146326A2 presents a pressure sensor for measuring the pressure of a fluid medium such as fuel and air in an internal combustion engine. When the fuel is combusted with atmospheric oxygen, a pressure of 200 MPa and higher is generated in the combustion chamber of the internal combustion engine. In order to operate the combustion engine as efficiently as possible, the pressure prevailing in the combustion chamber is measured and used as a parameter for controlling or regulating the combustion of the fuel with the atmospheric oxygen.

For mounting and demounting of the pressure sensor of EP1146326A2 on the combustion chamber, the wall of the combustion chamber comprises a mounting bore with an internal thread. The pressure sensor comprises a hollow mounting screw and a sensor device. The hollow mounting screw comprises a cavity for holding the sensor device and an external thread for screwing into the internal thread. The pressure sensor mounted in this way via its external thread in the internal thread of the wall is in direct contact with the fluid medium.

The sensor device of EP1146326A2 comprises a sensor housing, a diaphragm, a sealing surface and a sensor element. Said sensor housing, diaphragm and sealing surface are integrally formed. The sensor housing is of hollow cylindrical shape comprising a channel extending along a longitudinal axis between a first end and a second end of said sensor housing. At the first end towards the mounting bore, the channel is open so that the fluid medium can enter the channel. At the second end facing away from the mounting bore the diaphragm is arranged. The diaphragm is thin and deformable. On the side of the diaphragm facing away from the channel said sensor element is arranged. The sensor element is a strain gauge. Under the effect of the pressure of the fluid medium, the diaphragm deforms, which strain gauge generates a measurement signal for the pressure-dependent deformation of the diaphragm.

To prevent the fluid medium from escaping from the combustion chamber via the mounting bore, the pressure sensor of EP1146326A2 has a disk-shaped sealing element with a first and a second sealing element surface. With its first sealing element surface, the sealing element rests on a sealing surface of the mounting bore. In the mounted state of the pressure sensor, the first sealing element surface presses against the sealing surface of the mounting bore, and the sealing surface of the sensor device arranged at the first end of the sensor housing presses against the second sealing element surface.

Due to the high temperatures in the combustion chamber, the sensor element of EP1146326A2 is arranged as far away as possible from the combustion chamber at the second end of the channel, where the temperatures are comparatively lower. However, the sealing surface of the sensor device is arranged at the first end of the channel, which is close to the combustion chamber. The disadvantage of this is that the pressure in the channel generates acoustic oscillations which can falsify the measurement signal.

During each mounting and demounting of the pressure sensor of EP1146326A2 in the mounting bore, there is a risk of damaging both of sealing element surfaces of the sealing element as well as the sealing surfaces of the mounting bore and the sensor device. This is because the tool which is applied to the hollow mounting screw in order to screw the external thread of the hollow mounting screw into or out of the internal thread of the wall can tilt and then generate excessively high clamping forces on the sealing surfaces. The excessively high clamping forces in turn cause plastic deformation of the sealing surfaces, which results in non-reversible impairment of the tightness of the seals of the pressure sensor in the mounting bore.

In the pressure sensor of EP1146326A2, said sensor housing, diaphragm and sealing surface of the sensor device as well as the disk-shaped sealing element are in direct contact with the fluid medium and are made of metallic material. If the fluid medium contains hydrogen, hydrogen from the fluid medium can penetrate the metallic material and cause hydrogen embrittlement in the metallic material. Hydrogen embrittlement is a change in the ductility and strength of the metallic material. Hydrogen embrittlement can lead to cracking with brittle fracture and failure of the pressure sensor.

OBJECTS AND SUMMARY OF THE INVENTION

The objects of the present invention are to provide a pressure sensor which is inexpensive to manufacture, which measures pressure as accurately as possible, which can be easily and quickly mounted and demounted in the mounting bore, whose seals in the mounting bore are subject to reduced risk of damage during mounting and demounting, and which has improved resistance to hydrogen embrittlement.

At least one of these objects is solved by the features described below.

The invention relates to a pressure sensor for measuring the pressure of a fluid medium; which pressure sensor comprises a mounting device, a sensor device and a sealing element, which mounting device holds said sensor device and which mounting device can be mounted in a mounting bore of a wall; which sensor device comprises a diaphragm and a sensor element, which fluid medium is in direct contact with the diaphragm of the pressure sensor mounted in the mounting bore via the mounting bore and which pressure acts on the sensor element via the diaphragm of the pressure sensor mounted in the mounting bore, which sensor element generates a measurement signal for a pressure-dependent deformation of the diaphragm; which sealing element a first sealing element of the pressure sensor mounted in the mounting bore in a first sealing seals the mounting bore with a sensor device surface of the sensor device and which sealing element of the pressure sensor mounted in the mounting bore in a second sealing seals the mounting bore with a wall surface of the wall; wherein the sealing element comprises a trunnion; wherein the sensor device comprises a socket; and wherein the socket permanently holds the trunnion by form fit.

In contrast to EP1146326A2, according to the invention the sealing element is held permanently by the sensor device. By the adjective "permanent" it is meant that the once formed form fit remains during the life time of the pressure sensor. The sealing element can therefore be mounted and demounted together with the pressure sensor in the mounting bore. Permanently combining the sealing element to the pressure sensor simplifies mounting and demounting of the pressure sensor. Also, during the mounting and demounting of the pressure sensor, the first seal formed by the sealing element with the sensor device surface is not detached, which ensures a temporally consistent quality of the first seal, because each time a seal is restored, the sealing surfaces can be damaged and the tightness of the seal can be impaired. If the pressure sensor is used to measure the pressure of a fluid medium containing hydrogen, the non-detachment of the first seal and the resulting preservation of the tightness of the first seal can also prevent hydrogen from escaping from a fluid medium containing hydrogen.

Advantageous improvements of the pressure sensor according to the invention are explained more fully below.

In an advantageous improvement, the sealing element has a first sealing element surface, which first sealing element surface is formed on the trunnion and the sensor device surface is formed in the socket.

This has the advantage that the first seal formed by the first sealing element surface with the sensor device surface occurs at the location of the form fit between the sealing element and the sensor device, which form fit ensures the time consistent quality of the first seal.

In an advantageous improvement, the pressure sensor has a longitudinal axis; wherein the trunnion is inserted into the socket in the axial direction.

The pressure sensor and the wall are rotationally symmetrical with respect to the longitudinal axis. Inserting the trunnion in axial direction into the socket simplifies the formation of the form fit between the socket and the trunnion.

In an advantageous improvement, the socket comprises a sensor device installation; wherein the trunnion comprises a sealing element installation; and wherein the sealing element installation and the sensor device installation are guide means during insertion of the trunnion into the socket.

These guide means also facilitate the formation of the form fit between the socket and the trunnion.

In an advantageous improvement, the socket comprises a socket base; wherein the trunnion comprises a trunnion head, which trunnion head is deformable; wherein, with an undeformed trunnion head inserted into the socket, there exists a trunnion head offset between the undeformed trunnion head and the socket base; and wherein the trunnion head offset is resolved by deformation of the non-deformed trunnion head into a deformed trunnion head, which deformed trunnion head abuts against the socket base in a planar manner and forms the permanent form fit with the socket base.

The form fit is thus formed with a deformable trunnion head inserted into the socket by deforming the deformable trunnion head. The force required for this purpose can be easily generated when mounting the pressure sensor. The force can be generated by screwing the pressure sensor into an internal thread of the wall via an external thread of the mounting device.

In an advantageous improvement, the deformed trunnion head is plastically deformed.

The plastic deformation of the deformed trunnion head is not reversible, i.e., the permanent form fit between the deformed trunnion head and the socket base can only be separated again by damaging or destroying the trunnion head and socket base. The permanent form fit is therefore very durable and allows a large number of mountings and demountings of the pressure sensor in the mounting bore.

In an advantageous improvement, the first sealing element surface is deformable; wherein, when an undeformed first sealing element surface is inserted into the socket, a first angular offset exists between the undeformed first sealing element surface and the sensor device surface; and wherein the first angular offset is resolved into a deformed first sealing element surface by deforming the undeformed first sealing element surface, and the deformed first sealing element surface abuts against the sensor device surface in a planar manner.

Thus, the first seal of the first sealing element surface with the sensor device surface is formed in situ by deforming a deformable first sealing element surface by molding the deformable first sealing element surface to the shape of the sensor device surface. The deformable first sealing element surface thus adapts precisely to the shape of the sensor device surface. In turn, the force required for this can be easily generated when the pressure sensor is mounted. The force can be generated by screwing the pressure sensor via an external thread of the mounting device into an internal thread of the wall.

In an advantageous improvement, the second sealing element surface is deformable; wherein, with an undeformed second sealing element surface abutting against the wall surface, a second angular offset exists between the undeformed second sealing element surface and the wall surface; and wherein the second angular offset is resolved into a deformed second sealing element surface by deformation of the undeformed second sealing element surface, and the deformed second sealing element surface abuts against the wall surface in a planar manner.

Also, the formation of the second seal between the sealing element and the wall is formed in situ by deformation of a deformable first sealing element surface by forming a deformable second sealing element surface to the shape of the wall surface. The deformable second sealing element surface thus adapts precisely to the shape of the wall surface. The force required for this purpose can in turn be easily generated when the pressure sensor is mounted. The force can be generated by screwing the pressure sensor via an external thread of the mounting device into an internal thread of the wall.

In another advantageous improvement, the sensor device comprises a sensor housing; wherein the diaphragm comprises a hinge, by which hinge the diaphragm is deformable; wherein the diaphragm comprises a flange, which flange forms a material bond with the sensor housing; and wherein the socket is formed in the flange.

Thus, the diaphragm and the sensor housing are fabricated in multiple parts and are joined together by a material bond, which is inexpensive to fabricate, unlike the pressure sensor of EP1146326A2.

In another advantageous improvement, the flange absorbs clamping forces, which clamping forces are generated when the pressure sensor is mounted in the mounting bore and which clamping forces act from the wall on the sealing element and act on the flange via the trunnion.

The clamping forces are thus absorbed by the flange of the diaphragm and do not reach the joint of the diaphragm. The flange of the diaphragm has a thickness comparable to that of the sensor housing to form the material bond with the sensor housing. The joint, on the other hand, is thinner than the flange. Typically, the flange is one order of magnitude thicker than the joint. The clamping forces are therefore absorbed by a mechanically stable material thickening of the sensor device and cannot damage the mechanically sensitive material thinning of the joint.

In another advantageous improvement, the diaphragm and the sensor housing are made of metallic material; and wherein the material bond is formed as a weld seam, which weld seam is arranged on the side of the first seal and the second seal facing away from the mounting bore.

In comparison with the structure of the metallic material of the sensor housing and the diaphragm, hydrogen of the fluid medium can penetrate very quickly and easily into the metallic material via the weld seam and cause hydrogen embrittlement. However, since the weld seam is arranged on the side of the first seal and the second seal facing away from the mounting bore, hydrogen of the fluid medium cannot reach the weld seam and thus cannot penetrate into the metallic material via the weld seam.

In another advantageous improvement, the fluid medium is located within a container, which container comprises the wall, and which wall closes the container; that the mounting bore comprises an inlet, via which inlet fluid medium enters the mounting bore from the inside the container; and that the diaphragm of the pressure sensor mounted in the mounting bore is the end of the pressure sensor facing the inlet.

While in the pressure sensor of EP1146326A2 the diaphragm is arranged at the end of a channel within the sensor housing, the diaphragm of the present invention is located at the foremost end of the pressure sensor. Due to the absence of the channel in an embodiment of the pressure sensor of the present invention, there are therefore no acoustic oscillations which can falsify the measurement signal.

In another advantageous improvement, only the diaphragm and the sealing element of the pressure sensor mounted in the mounting bore are in direct contact with the fluid medium via the mounting bore.

Thus, only two components of the pressure sensor are in direct contact with the fluid medium, in particular the sensor housing is not in contact with the fluid medium and thus need not be composed of material that is resistant to hydrogen. This is of particular importance for a fluid medium containing hydrogen, because only the materials of the diaphragm and the sealing element then have to be resistant to hydrogen, so that the pressure sensor can be manufactured at low costs.

BRIEF DESCRIPTION OF THE DRAWINGS

In the following, the invention is explained in more detail by way of example with reference to the drawings, in which.

Identical elements are marked with the same reference symbols in the drawings.

DETAILED DESCRIPTION OF EXEMPLARY EMBODIMENTS OF THE INVENTION

Figure 1:
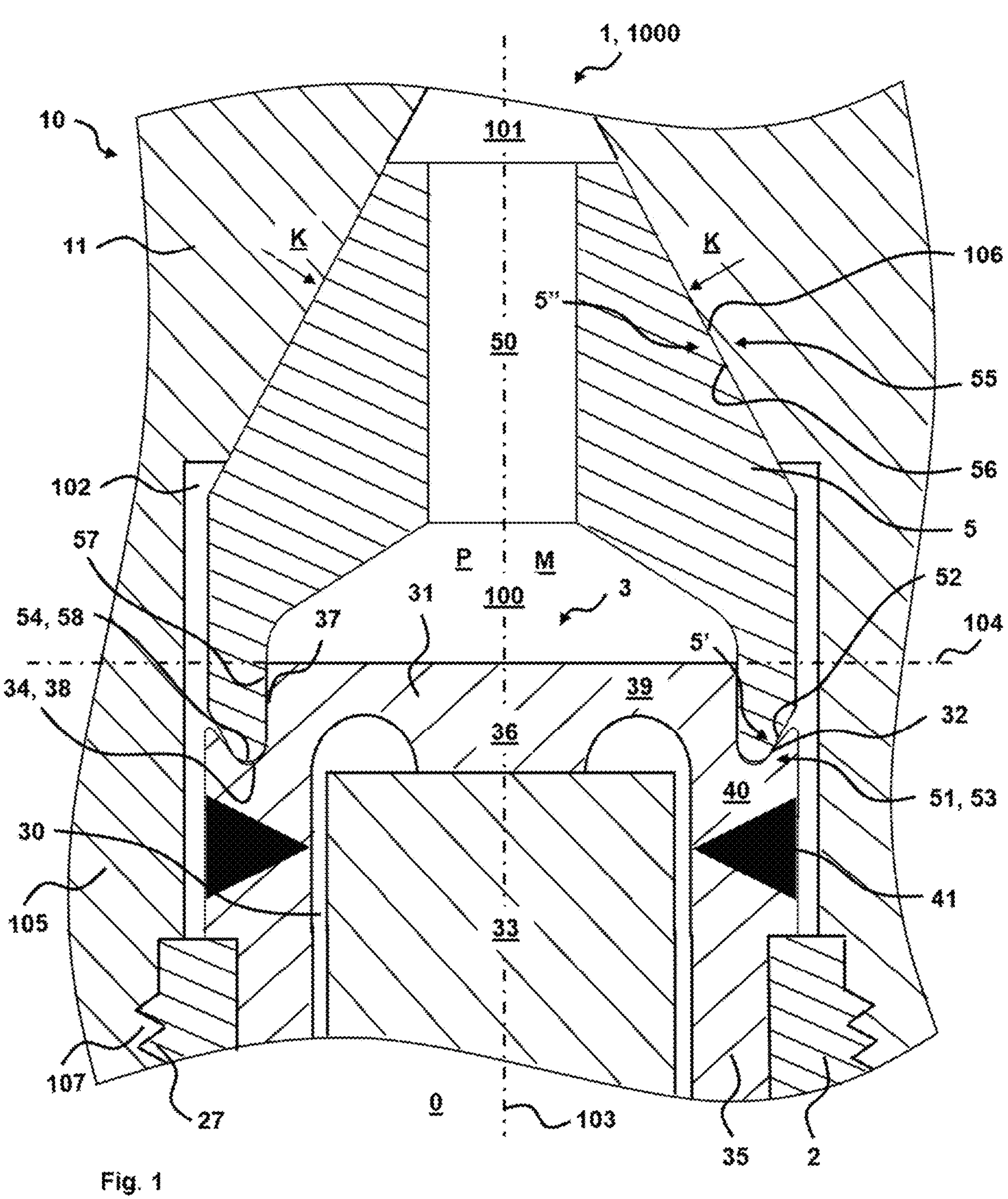
FIG. 1 shows a longitudinal section through a part of a pressure sensor 1 comprising a sensor device 3 and a sealing element 5 in a wall 11.

The pressure sensor 1 shown in the longitudinal section of FIG. 1 is used to measure the pressure P of a fluid medium M. The fluid medium M can be gaseous or liquid. The pressure P can be up to 1000 bar. The fluid medium M may contain hydrogen. In the following, a fluid medium M containing hydrogen is understood to be a fluid medium M which contains at least one volume percent (vol %) of hydrogen.

As schematically shown in FIG. 1, the fluid medium M is located within a container that is generally designated by the numeral 10. The container 10 may be a combustion chamber of an internal combustion engine, a pressure vessel, and so on. The container 10 comprises a wall 11. Said wall 11 defines and closes the interior space of the container 10. The wall 11 is pressure-tight and gas-tight, i.e. during the lifetime of the container 10 and under the permissible operating conditions of the container 10, the wall 11 resists the pressure P and allows only negligible amounts of the fluid medium M to escape. For the purposes of the present invention, a gas-tight wall 11 has a leakage rate to helium of less than $10^{-6}$ mbar l/s. The wall 11 is made of resistant material such as stainless steel, fiber reinforced plastic, etc.

Figure 2:
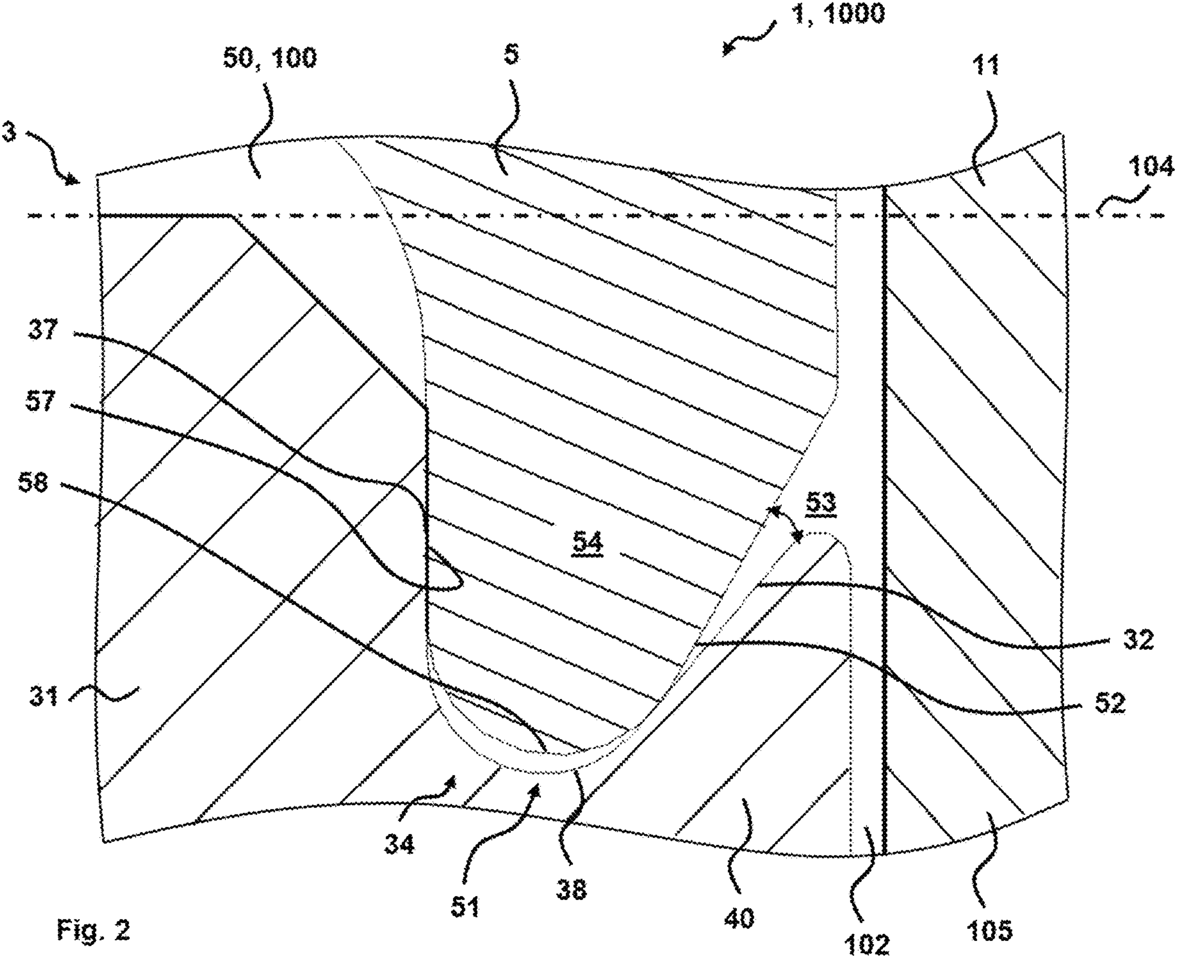
FIG. 2 shows an enlarged section of the pressure sensor 1 according to FIG. 1 in the region of the sensor device 3 and the sealing element 5 before the deformation of a trunnion head 58 and a first sealing element surface 52.
Figure 3:
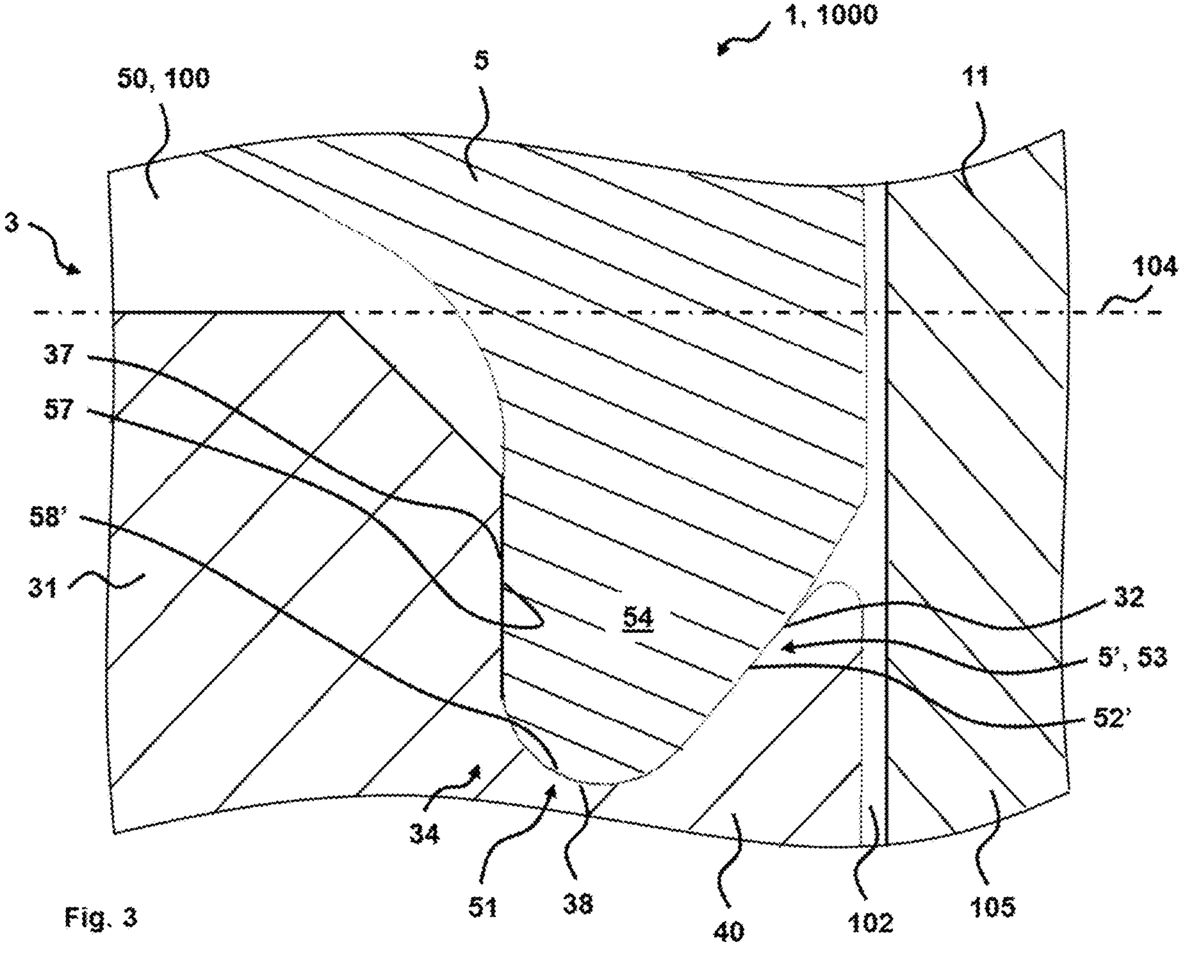
FIG. 3 shows an enlarged section of the pressure sensor 1 according to FIG. 2 in the region of the sensor device 3 and the sealing element 5 after the deformation of the trunnion head 58 and the first sealing element surface 52.

The pressure sensor 1 and the wall 11 are shown in FIGS. 1-3 with respect to a longitudinal axis 103 and a transverse plane 104 perpendicular thereto. The pressure sensor 1 and the wall 11 are rotationally symmetrical with respect to the longitudinal axis 103. In the following description, the components of the pressure sensor 1 are explained in an axial direction along the longitudinal axis 103 and in a radial direction perpendicular to the longitudinal axis 103.

The wall 11 defines a mounting bore 100. The mounting bore 100 is a through hole permitting fluid communication between the interior of the container 10 and the space external to the container 10. The mounting bore 100 defines an inlet 101 through which fluid medium M enters the mounting bore 100 from inside the container 10. The inlet 101 is located in a region of the mounting bore 100 close to the container. The mounting bore 100 has a wall surface 106. The wall surface 106 is also located in the region of the mounting bore 100 that is close to the container. Further spaced apart from the container 10, the wall surface 106 passes into a mounting section 105. In the mounting section 105, the mounting bore 100 defines an internal thread 107. The internal thread 107 is used for mounting the pressure sensor 1 in the mounting bore 100. Thus, the mounting bore 100 extends in an axial direction from the interior of the container 10 to the pressure sensor 1 mounted in the mounting bore 100. By mounting the pressure sensor 1 in the mounting bore 100, the mounting bore 100 forms a mounting gap 102 in the region of the mounting section 105. The end of the pressure sensor 1 facing the inlet 101 is exposed to the fluid medium M and the pressure P in the mounting bore 100, and the end of the pressure sensor 1 facing away from the inlet 101 is in an environment 0 of the container 10. Atmospheric pressure prevails in the environment 0 of the container 10. The container 10 and the pressure sensor 1 mounted in the mounting bore 100 form a system 1000.

The pressure sensor 1 comprises a mounting device 2 and a sensor device 3.

The mounting device 2 is hollow and cylindrical in shape and is made of a resistant metallic material such as a pure metal, a nickel alloy, a cobalt alloy, an iron alloy, etc. The mounting device 2 may be a hollow mounting screw as known from EP1146326A2. The mounting device 2 holds the sensor device 3. Thus, the mounting device 2 may hold the sensor device 3 via a form fit. The mounting device 2 has an external thread 27 for fastening in the internal thread 107. To mount the pressure sensor 1 in the mounting bore 100, the external thread 27 is screwed into the internal thread 107. This produces clamping forces. The mounting of the pressure sensor 1 in the mounting bore 100 is reversible, i.e., the mounted pressure sensor 1 can be demounted by being screwed in reverse rotation out of the internal thread 107 via the external thread 27.

The sensor device 3 comprises a diaphragm 31 and a sensor housing 35. The sensor housing 35 is hollow and desirably cylindrical in shape. The diaphragm 31 desirably is disc-shaped. The diaphragm 31 and the sensor housing 35 desirably are made of a resistant metallic material such as a pure metal, a nickel alloy, a cobalt alloy, an iron alloy, etc. Preferably, the diaphragm 31 and the sensor housing 35 are joined together by a material bond. In the longitudinal section of FIG. 1, the material bond is formed as a weld seam 41 extending 360° around the longitudinal axis 103.

The diaphragm 31 of the pressure sensor 1 mounted in the mounting bore 100 is the end of the pressure sensor 1 facing the inlet 101. Thus, the diaphragm 31 is configured and disposed to be in direct contact with the fluid medium M of the mounting bore 100.

The side of the diaphragm 31 facing the inlet 101 is located in the transverse plane 104. The transverse plane 104 confines the sensor device 3 of the pressure sensor 1 mounted in the mounting bore 100 in the direction towards the inlet 101. In the longitudinal section of FIGS. 1 to 3, the mounting bore 100 is located above the transverse plane 104 in the axial direction, and the components of the sensor device 3 are located below the transverse plane 104 in the axial direction.

The side of the diaphragm 31 facing the inlet 101 is located in the transverse plane 104. The transverse plane 104 confines the sensor device 3 of the pressure sensor 1 mounted in the mounting bore 100 in the direction towards the inlet 101. In the longitudinal section of FIGS. 1 to 3, the mounting bore 100 is located above the transverse plane 104 in the axial direction, and the components of the sensor device 3 are located below the transverse plane 104 in the axial direction.

The sensor device 3 comprises a sensor element 33. The sensor element 33 serves to generate a measurement signal for the pressure P to be measured. The sensor element 33 is arranged in the recess 30. The sensor element 33 may be a piezoelectric sensor element or a piezoresistive sensor element.

The pressure P acts on the sensor element 33 via the diaphragm 31. The diaphragm 31 is thin in certain areas and deformable. The diaphragm 31 comprises a punch 36, a joint 39 and a flange 40 as shown in FIG. 1. In the area of the longitudinal axis 103, the diaphragm 31 is formed as a punch 36. Said punch 36 serves for the uniform introduction of the pressure 5 to be measured into the sensor element 33. For this reason, the punch 36 forms a material thickening in the axial direction, thereby compensating for pressure peaks acting locally on the diaphragm 31 on the way to the sensor element 33. In the radial direction, the punch 36 transitions into the joint 39. The joint 39 is configured to allow the diaphragm 31 to deform. Therefore, the joint 39 is formed as a thinning of material in the axial direction. The joint 39 may have a thickness of less than 200 μm in the axial direction. The joint 39 is arranged at a constant radial distance from the longitudinal axis 103 and extends 360° around the punch 36 at this radial distance. In the radial direction, the joint 39 transitions into the flange 40 in its region facing away from the punch 36. At the flange 40, said weld seam 41 with the sensor housing 35 is welded. Therefore, the flange 40 forms a material thickening in the axial direction. The flange 40 may have a thickness of more than 2 mm in the axial direction. Thus, the flange 40 is an order of magnitude thicker in the axial direction than the joint 39. As a result, the flange 40 has a thickness comparable to that of the sensor housing 35, whereby when welding said weld seam 41, the flange 40 and the sensor housing 35 absorb equal amounts of heat, and accordingly there is no excessive heating of either of these components of the sensor arrangement 3. Excessive heating of these components during welding would be detrimental to the life of the weld seam 41.

The sensor element 33 is arranged on the side of the diaphragm 31 facing away from the inlet 101 on the longitudinal axis 103 on the punch 36. Under the effect of the pressure P, the diaphragm 31 deforms in the area of the joint 39, thereby the punch 36 presses in the axial direction on the sensor element 33. During this deformation, the joint 39 is supported on the sensor housing 35 via the flange 40.

The sensor element 33 is configured to generate a measurement signal for a pressure-dependent deformation of the diaphragm 31. The measurement signal is proportional to the acting pressure P. The piezoelectric sensor element generates an electric charge quantity as the measurement signal. The piezoresistive sensor element generates an electrical voltage as the measurement signal.

The pressure sensor 1 comprises a hollow cylindrical sealing element 5. The sealing element 5 of the pressure sensor 1 mounted in the mounting bore 100 serves to prevent fluid medium M from escaping from the container 10 into the environment 0 of the container 10 via the mounting bore 100. The sealing element 5 is arranged on the side of the diaphragm 31 facing the inlet 101 on the longitudinal axis 103 between the sensor device 3 and the wall 11. As shown in FIG. 1 for example, the sealing element 5 comprises a feed 50 in the region of the longitudinal axis 103. Said feed 50 is a through hole. The feed 50 extends in the axial direction from the inlet 101 to the diaphragm 31. Fluid medium M passes from the inlet 101 to the diaphragm 31 via the feed 50. The sealing element 5 is made of resistant, metallic material such as a pure metal, a nickel alloy, a cobalt alloy, an iron alloy, etc.

The sensor device 3 permanently holds the sealing element 5 by form fit. For this purpose, the sensor device 3 comprises a socket 34 and the sealing element 5 comprises a trunnion 54. The trunnion 54 confines the sealing element 5 in the direction of the sensor device 3. The trunnion 54 is inserted into the socket 34 in the axial direction.

Preferably, said socket 34 is formed in the flange 40. In the radial direction, the socket 34 is formed in the flange 40 outside of the punch 36. In the axial direction, the socket 34 is formed below the transverse plane 104. Said socket 34 is arranged in the flange 40 at a constant radial distance from the longitudinal axis 103 and extends 360° around the diaphragm 31 at this radial distance.

Preferably, socket 34 is groove-shaped, comprising a sensor device installation 37, a socket base 38, and a sensor device surface 32. The socket base 38 is formed outside of the sensor device installation 37 in the radial direction, and said sensor device surface 32 is formed outside of the socket base 38 in the radial direction. In the longitudinal section of FIGS. 1 to 3, the socket base 38 has the shape of a circular arc of 135°+/−10°. An end of the socket base 38 that is radially inward with respect to the longitudinal axis 103 passes into the sensor device installation 37, and an end of the socket base 38 that is radially outward with respect to the longitudinal axis 103 passes into the sensor device surface 32. The sensor device installation 37 extends substantially parallel to the longitudinal axis 103, and the sensor device surface 32 is conical. The sensor device surface 32 extends at an angle of 45°+/−10° with respect to the longitudinal axis 103.

The trunnion 54 is formed on the sealing element 5 in the radial direction outside of the feed 50. Said trunnion 54 is arranged at a constant radial distance from the longitudinal axis 103 and preferably extends 360° around the feed 50 at this radial distance.

The trunnion 54 preferably comprises a sealing element installation 57, a trunnion head 58, and a first sealing element surface 52. The trunnion head 58 is formed outside of the sealing element installation 57 in the radial direction, and the first sealing element surface 52 is formed outside of the trunnion head 58 in the radial direction. In the longitudinal section of FIGS. 1 to 3, the trunnion head 58 has the shape of a circular arc of 135°+/−10°. An end of the trunnion head 58 that is radially inward with respect to the longitudinal axis 103 passes into the sealing element installation 57, and an end of the trunnion head 58 that is radially outward with respect to the longitudinal axis 103 passes into the first sealing element surface 52. The sealing element installation 57 extends substantially parallel to the longitudinal axis 103, and the first sealing element surface 52 is conical. The first sealing element surface 52 extends at an angle of 45°+/−10° to the longitudinal axis 103.

The sealing element installation 57 and the sensor device installation 37 serve as guide means during insertion of the trunnion 54 into the socket 34. For this purpose, the sealing element installation 57 and the sensor device installation 37 abut against each other in a planar manner in the longitudinal section of FIGS. 1 to 3.

Compared to the material of the diaphragm 31, the material of the sealing element 5 has a lower compressive strength, which means that the material tends to be less resistant to compressive forces. Also, the geometries of the interacting components of the sealing element 5 and the diaphragm 31 are selected in such manner that the geometry of the trunnion head 58 resists deformation less than the geometry of the socket base 38 and that the geometry of the first sealing element surface 52 resists deformation less than the geometry of the sensor device surface 32.

Thus, said trunnion head 58 is deformable. In the longitudinal section of FIGS. 1 and 2, an undeformed trunnion head 58 is inserted into the socket 34, and there is a trunnion head offset 51 between the trunnion head 58 and the socket base 38 according to FIG. 2. The trunnion head 58 of the trunnion 54 inserted into the socket 34 is located below the transverse plane 104 in the axial direction. The trunnion head offset 51 is a gap where the undeformed trunnion head 58 does not abut against the socket base 38 in a planar manner. Only after deformation of the undeformed trunnion head 58 into a deformed trunnion head 58' according to FIG. 3, does the deformed trunnion head 58' abut against the socket base 38 in a planar manner. The force required to form the deformed trunnion head 58' is generated during mounting of the pressure sensor 1. Advantageously, the force is generated by screwing the pressure sensor 1 via the external thread 27 into the internal thread 107. The deformed trunnion head 58' is plastically deformed, i.e., its deformation is not reversible; when the pressure sensor 1 is demounted, the deformation of the deformed trunnion head 58' persists. The deformed trunnion head 58' forms a permanent form fit with the socket base 38, which form fit can only be separated again by damaging or destroying the trunnion head 58 and the socket base 38.

The first sealing element surface 52 and the sensor device surface 32 form a first seal 5' of the mounting bore 100 with respect to the mounting gap 102, to prevent fluid medium M from escaping from the mounting bore 100 through the feed line 50 to the mounting gap 102 into the environment 0 of the container 10. The first sealing element surface 52 is also deformable. In the longitudinal section of FIGS. 1 and 2, an undeformed first sealing element surface 52 and the sensor device surface 32 are in contact with each other, and there is a first angular offset 53 between the undeformed first sealing element surface 52 and the sensor device surface 32 according to FIG. 2. The first angular offset 53 is a gap where the undeformed first sealing element surface 52 does not abut against the sensor device surface 32 in a planar manner. Only after deformation of the undeformed first sealing element surface 52 into a deformed first sealing surface 52' according to FIG. 3, does the deformed first sealing element surface 52' abut against the sensor device surface 32 in a planar manner and form the first seal 5'. The deformation of the undeformed first sealing element surface 52 occurs in situ, and the deformable first sealing element surface 52 thus adapts exactly to the shape of the sensor device surface 32. The force required to form the deformed first sealing element surface 52' is generated during mounting of the pressure sensor 1. Advantageously, the force is generated by screwing the pressure sensor 1 via the external thread 27 into the internal thread 107. The deformed first sealing element surface 52' is plastically deformed, i.e., its deformation is not reversible. Thus, when the pressure sensor 1 is unscrewed from the internal thread 107 via the external thread 27, the deformation of the deformed first sealing element surface 52' persists.

The sealing element 5 comprises a second sealing element surface 56. The second sealing element surface 56 confines the sealing element 5 in a direction towards the wall 11. The second sealing element surface 56 cooperates with the wall surface 106. The second sealing element surface 56 and the wall surface 106 are conical. The second sealing element surface 56 and the wall surface 106 form a second seal 5" of the mounting bore 100 with respect to the mounting gap 102, to prevent fluid medium M from escaping from the mounting bore 100 to the mounting gap 102 into the environment 0 of the container 10.

Figure 4:
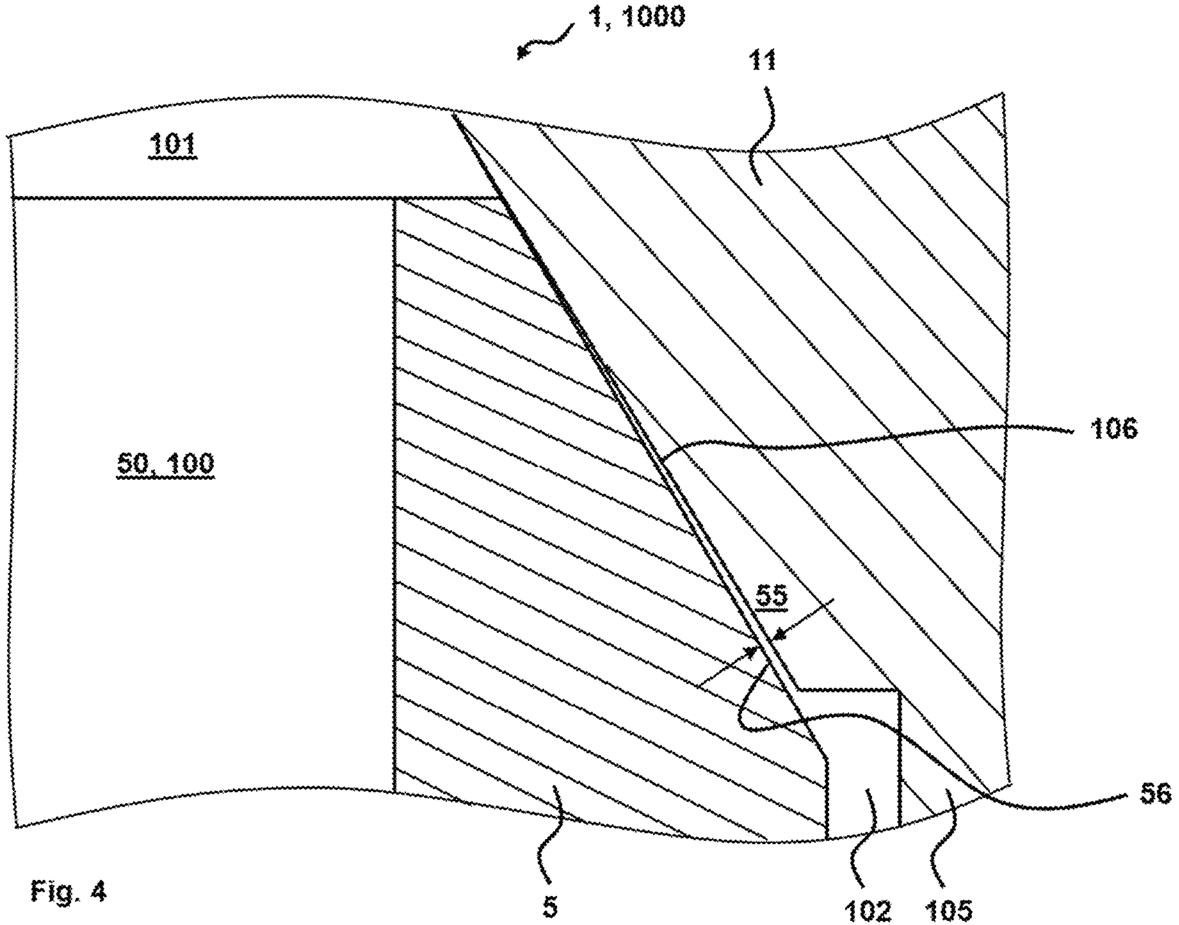
FIG. 4 shows an enlarged section of the pressure sensor 1 according to FIG. 1 in the region of the sealing element 5 and the wall 11 before the deformation of a second sealing element surface 56.
Figure 5:
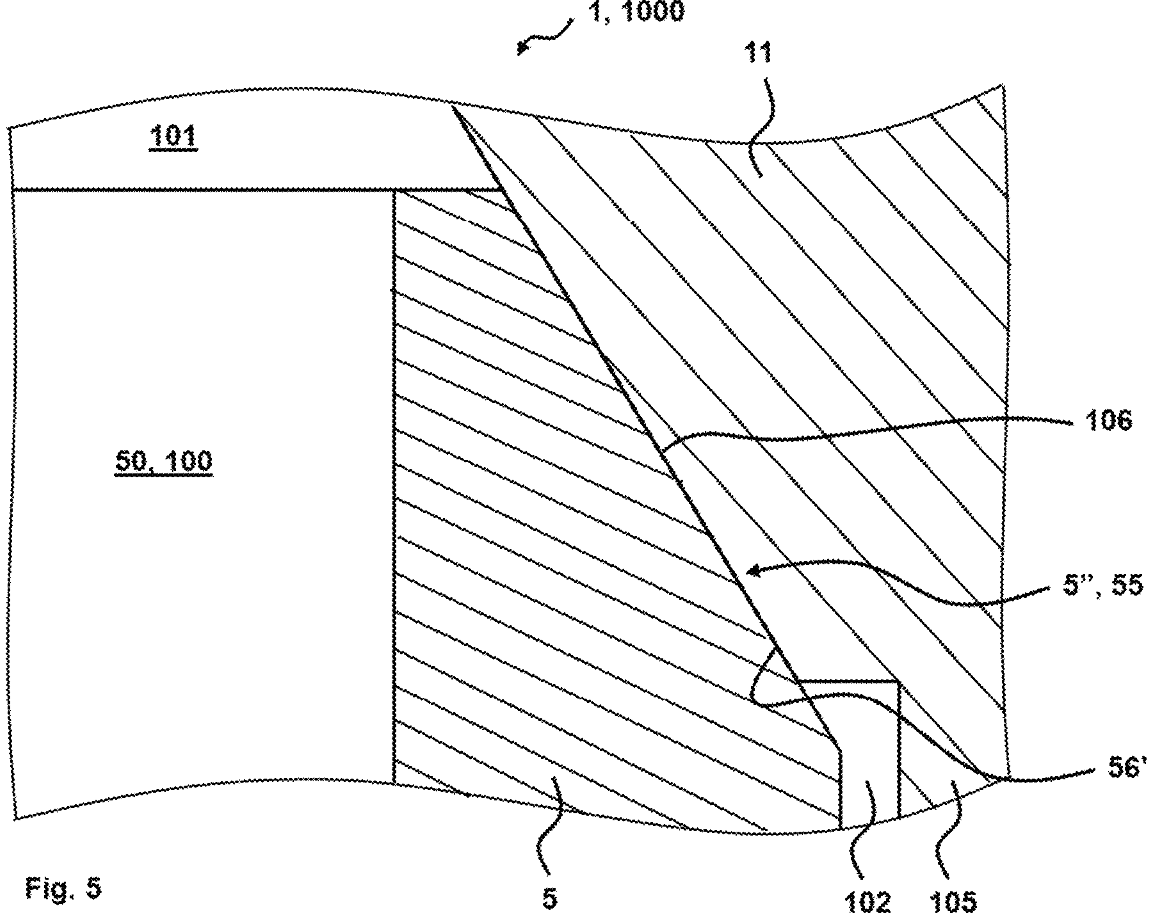
FIG. 5 shows an enlarged section of the pressure sensor 1 according to FIG. 4 in the region of the sealing element 5 and the wall 11 after the deformation of the second sealing element surface 56.

The second sealing element surface 56 is also deformable. In the longitudinal section of FIGS. 1 and 4, an undeformed second sealing element surface 56 and the wall surface 106 abut against each other, and there is a second angular offset 55 between the undeformed second sealing element surface 56 and the wall surface 106 according to FIG. 4. The second angular offset 55 is a gap where the undeformed second sealing element surface 56 does not abut against the wall surface 106 in a planar manner. Only after deformation of the undeformed second sealing element surface 56 into a deformed second sealing element surface 56' according to FIG. 5, does the deformed second sealing element surface 56' abut against the wall surface 106 in a planar manner and form the second seal 5". The deformation of the undeformed second sealing element surface 56 takes place in situ, and the deformable second sealing element surface 56 thus exactly adapts to the shape of the wall surface 106. The force required to form the deformed second sealing element surface 56' is generated during mounting of the pressure sensor 1. Advantageously, the force is generated by screwing the pressure sensor 1 via the external thread 21 into the internal thread 107. The deformed second sealing element surface 56' is plastically deformed, i.e., its deformation is not reversible. Thus, after the pressure sensor 1 has been unscrewed from the internal thread 107 via the external thread 27, the deformation of the deformed second sealing element surface 56' persists.

The flange 40 also absorbs clamping forces K, which clamping forces K are generated when the pressure sensor 1 is mounted in the mounting bore 100 and which clamping forces K act on the flange 40 via the trunnion 54 as schematically shown in FIG. 1. In the longitudinal section of FIG. 1, the clamping forces act from the wall surface 106 of the wall 11 onto the second sealing element surface 56 of the sealing element 5 and are conducted in the sealing element 5 to the trunnion 54.

LIST OF REFERENCE NUMERALS

0 environment
1 pressure sensor
2 mounting device
27 external thread
3 sensor device
30 recess
31 diaphragm
32 sensor device surface
33 sensor element
34 socket
35 sensor housing
36 punch
37 sensor device installation
38 socket base
39 joint
40 flange
41 weld seam
5 sealing element
5' first seal
5" second seal
50 feed
51 trunnion head offset
52 undeformed first sealing element surface
52' deformed first sealing element surface
53 first angular offset
54 trunnion
55 second angular offset
56 undeformed second sealing element surface
56' deformed second sealing element surface
57 sealing element installation
58 undeformed trunnion head
58' deformed trunnion head
10 container
11 wall
100 mounting bore
101 inlet
102 mounting gap
103 longitudinal axis
104 transverse plane
105 mounting section
106 wall surface
107 internal thread
1000 system
K clamping forces
M fluid medium
P pressure

What is claimed is:

1. A pressure sensor for measuring the pressure of a fluid medium confined by a wall that defines a mounting bore configured for mounting the pressure sensor in a manner that disposes the pressure sensor for measuring the pressure in the fluid medium, wherein the mounting bore is partially defined by a wall surface, the pressure sensor comprising:

a mounting device configured to be mounted in the mounting bore;

a sensor device held by the mounting device and including a diaphragm and a sensor element, wherein the sensor device defines a socket that is partially defined by a sensor device surface;

wherein the diaphragm is configured and disposed to be in direct contact with the fluid medium when the mounting device is mounted in the mounting bore;

wherein the sensor element is configured so that when the mounting device is mounted in the mounting bore, the sensor element generates a measurement signal commensurate with a pressure-dependent deformation of the diaphragm;

a sealing element that includes a trunnion that is deformable to define a plastically deformed first sealing element surface that plastically deforms to conform to the sensor device surface in an irreversible form fitting first sealing that prevents the fluid medium from escaping from the mounting bore; and wherein the sealing element defines a deformable second sealing element surface that is deformed to touch the wall surface of the wall when the mounting device is mounted in the mounting bore and to form a second sealing that seals the mounting bore against escape of the fluid medium from the mounting bore.

2. The pressure sensor according to claim 1, wherein the mounting bore defines an internal thread and the mounting device defines an external thread that is configured to produce clamping forces when engaging the internal thread defined by the mounting bore.

3. The pressure sensor according to claim 1, wherein the pressure sensor is configured to elongate in an axial direction along a longitudinal axis and the trunnion is configured to be inserted into the socket the in axial direction.

4. The pressure sensor according to claim 3, wherein said socket comprises a sensor device installation; wherein said trunnion comprises a sealing element installation; and wherein said sealing element installation and said sensor device installation are guide means when inserting said trunnion into said socket.

5. The pressure sensor according to claim 1, wherein the deformed first sealing element surface is configured so that when inserted into the socket, a first angular offset will exist between an undeformed first sealing element surface and the sensor device surface; and wherein deformation of the first sealing element surface eliminates the first angular offset by a deformation of the first sealing element surface so that the deformed first sealing element surface abuts against the sensor device surface in a planar manner.

6. The pressure sensor according to claim 1, wherein the second sealing element surface is configured so that a second angular offset will exist between an undeformed second sealing element surface and the wall surface; and wherein deformation of the second sealing element surface eliminates the second angular offset by a deformation of the second sealing element surface into a deformed second sealing element surface that abuts against the wall surface in a planar manner.

7. The pressure sensor according to claim 1, wherein the sensor device comprises a sensor housing; wherein the diaphragm comprises a joint by which the diaphragm is deformable; wherein the diaphragm comprises a flange that forms a material bond with the sensor housing; and wherein the socket is formed in the flange.

8. The pressure sensor according to claim 7, wherein the diaphragm and the sensor housing are made of metallic material; and wherein the material bond is formed as a weld seam that is arranged on the side of the first seal and the second seal facing away from the mounting bore.

9. The pressure sensor according to claim 7, wherein the flange absorbs clamping forces that are generated when the pressure sensor is mounted in the mounting bore and act from the wall on the sealing element and act on the flange via the trunnion.

10. A pressure sensor according to claim 1, wherein only the diaphragm and the sealing element of the pressure sensor mounted in the mounting bore are in direct contact with the fluid medium via the mounting bore.

11. The pressure sensor according to claim 1, wherein the fluid medium is located inside a container, which container comprises the wall, and which wall closes the container; wherein the mounting bore comprises an inlet, via which inlet the fluid medium enters the mounting bore from the interior of the container; and wherein the diaphragm of the pressure sensor mounted in the mounting bore is an end of the pressure sensor facing the inlet.

12. The pressure sensor according to claim 1, wherein the form fitting first sealing is configured to prevent a fluid medium that contains hydrogen from escaping from the mounting bore.

13. A pressure sensor for measuring the pressure of a fluid medium confined by a wall that defines a mounting bore configured for mounting the pressure sensor in a manner that disposes the pressure sensor for measuring the pressure in the fluid medium, the pressure sensor comprising:

- a mounting device configured to be mounted in the mounting bore;
- a sensor device held by the mounting device and including a diaphragm and a sensor element, wherein the sensor device defines a socket that is partially defined by a sensor device surface;
- wherein the diaphragm is configured and disposed to be in direct contact with the fluid medium when the mounting device is mounted in the mounting bore;
- wherein the sensor element is configured so that when the mounting device is mounted in the mounting bore, the sensor element generates a measurement signal commensurate with a pressure-dependent deformation of the diaphragm;
- a sealing element that includes a trunnion that is deformable to define a deformed first sealing element surface touching the sensor device surface in a form fitting first sealing that prevents the fluid medium from escaping from the mounting bore;
- wherein the sealing element defines a deformable second sealing element surface that is deformed to touch the wall surface of the wall when the mounting device is mounted in the mounting bore and to form a second sealing that seals the mounting bore against escape of the fluid medium from the mounting bore;
- wherein the pressure sensor is configured to elongate in an axial direction along a longitudinal axis and the trunnion is configured to be inserted into the socket in the axial direction;
- wherein the mounting bore is partially defined by a wall surface, wherein the socket comprises a socket base;
- wherein the trunnion comprises a trunnion head that is deformable;
- wherein a trunnion head offset exists between an undeformed trunnion head and the socket base; and
- wherein the trunnion head offset is configured to be resolved by deformation of the nondeformed trunnion head into the deformed trunnion head that abuts against the socket base in a planar manner and forms the permanent form fit with the socket base.

14. The pressure sensor according to claim 13, wherein the deformed trunnion head is plastically deformed.

15. A system for mounting and demounting a pressure sensor, the system comprising:

- a container having a wall that is configured to enclose an interior of the container in a pressure-tight and gas-tight manner;
- a fluid medium located in the interior of the container under a pressure;
- wherein the wall comprises a mounting bore;
- wherein the pressure sensor is configured to be mounted in the mounting bore of the wall and demountable from the mounting bore; and the pressure sensor comprising:
  - a mounting device configured to be mounted in the mounting bore;
  - a sensor device held by the mounting device and including a diaphragm and a sensor element, wherein the sensor device defines a socket that is partially defined by a sensor device surface;
  - wherein the diaphragm is configured and disposed to be in direct contact with the fluid medium when the mounting device is mounted in the mounting bore;
  - wherein the sensor element is configured so that when the mounting device is mounted in the mounting bore, the sensor element generates a measurement signal commensurate with a pressure-dependent deformation of the diaphragm;
  - a sealing element that includes a trunnion that is deformable to define a plastically deformed first sealing element surface that plastically deforms to conform to the sensor device surface in an irreversible form fitting first sealing that prevents the fluid medium from escaping from the mounting bore; and
  - wherein the sealing element defines a deformable second sealing element surface that is deformed to touch the wall surface of the wall when the mounting device is mounted in the mounting bore and to form a second sealing that seals the mounting bore against escape of the fluid medium from the mounting bore.

* * * * *